United States Patent [19]

Bury

[11] 4,354,458
[45] Oct. 19, 1982

[54] TRACTOR ENGINE AIR SUPPLY MEANS

[75] Inventor: Cecil T. Bury, Huddersfield, England

[73] Assignee: David Brown Tractors, Ltd., Huddersfield, England

[21] Appl. No.: 184,825

[22] Filed: Sep. 8, 1980

[30] Foreign Application Priority Data

Sep. 14, 1979 [GB] United Kingdom ............... 7931912

[51] Int. Cl.³ .............................................. B60K 13/02
[52] U.S. Cl. ................... 123/52 M; 123/41.64; 123/198 E; 180/54 A; 55/DIG. 28
[58] Field of Search ............ 123/41.64, 198 E, 52 M; 55/DIG. 28; 180/54 A, 900

[56] References Cited

U.S. PATENT DOCUMENTS

| 2,881,860 | 4/1959 | Ternes | 55/DIG. 28 |
| 3,207,250 | 9/1965 | Bamford | 55/DIG. 28 |
| 3,357,163 | 12/1967 | Burger et al. | 55/DIG. 28 |
| 3,791,112 | 2/1974 | Libstone | 55/DIG. 28 |
| 4,133,547 | 1/1979 | Fox | 123/41.64 |
| 4,235,298 | 11/1980 | Sackett et al. | 123/198 E |
| 4,257,368 | 3/1981 | Hofbauer | 123/198 E |

Primary Examiner—Craig R. Feinberg

[57] ABSTRACT

Agricultural tractors usually have an intake for the engine air supply disposed above the hood. This contributes to the noise reaching the driver. To reduce the noise level the intake is situated near the front of the hood, which is displaceable from an operative position covering the engine, and communicates with the front end of longitudinally extending air supply ducting secured to the hood. The engine has at least one air cleaner mounted on it beneath and towards the rear of the hood, and an exit hole in the ducting communicates, when the hood is in its operative position, with the inlet of the or each air cleaner via a resilient sealing ring.

9 Claims, 2 Drawing Figures

TRACTOR ENGINE AIR SUPPLY MEANS

BACKGROUND OF INVENTION

The invention relates to tractor engine air supply means, and has for its object to situate the air intake as far from the driver's position as convenience and styling will allow in order to reduce the level of noise reaching the driver from said intake.

SUMMARY OF INVENTION

According to the invention, a tractor has an internal combustion engine with at least one air cleaner mounted on it, the outlet of the or each air cleaner communicating with an inlet manifold of the engine, and a hood displaceable from an operative position covering the engine and having longitudinally extending air supply ducting secured to it, said ducting having at its front end an intake which communicates with the exterior of the hood and also having an exit hole which communicates, when the hood is in its operative position, with the inlet of the or each air cleaner by way of a resilient sealing ring.

BRIEF DESCRIPTION OF DRAWINGS

A preferred embodiment of the invention will now be described, by way of example, with reference to the accompanying drawings of which.

DESCRIPTION OF PREFERRED EMBODIMENT

Figure 1:
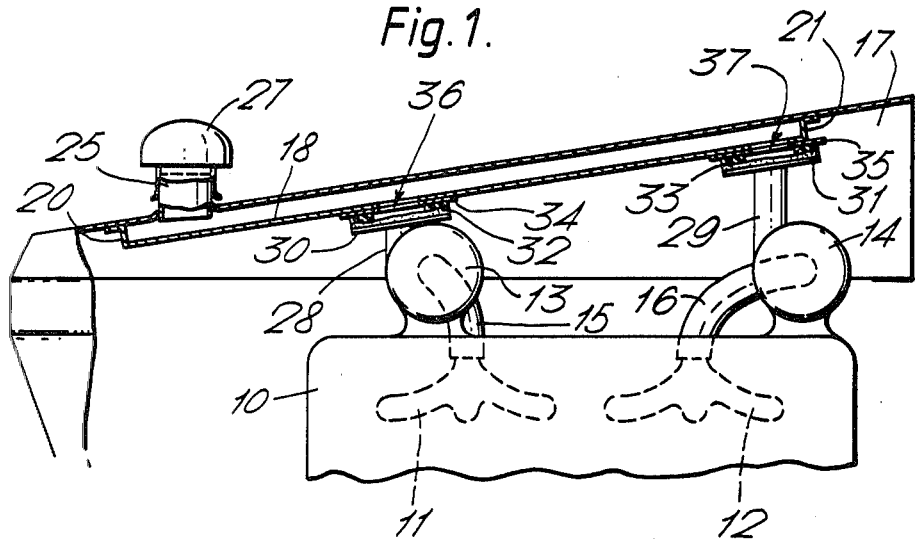
FIG. 1 is a diagrammatic side elevation of a tractor hood and associated engine air supply means, shown partly in section on the line A—A in FIG. 2.
Figure 2:
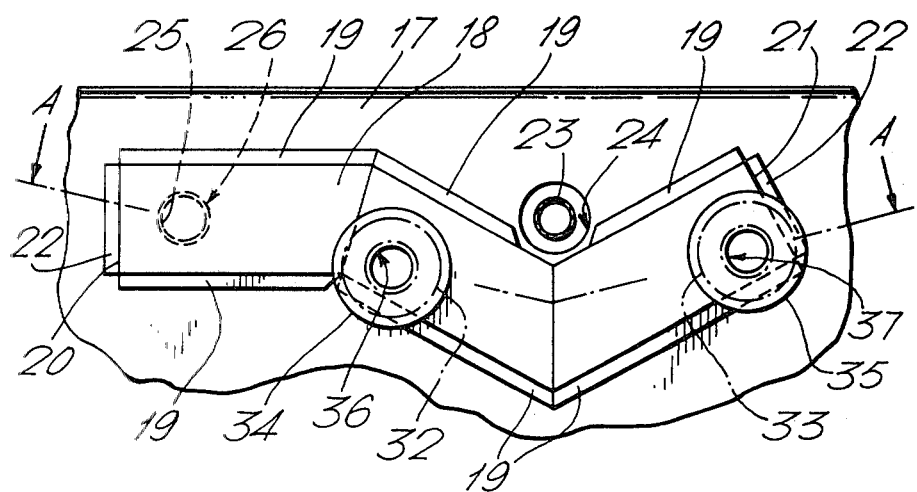
FIG. 2 is a diagrammatic view on the underside of air supply ducting forming part of said means.

Referring now to the drawings, an agricultural tractor has a six-cylinder diesel engine 10 provided with two inlet manifolds 11 and 12, the manifold 11 supplying air to the front three cylinders and the manifold 12 supplying air to the rear three cylinders in known manner. Mounted transversely on top of the engine 10 are two cylindrical paper-cartridge type air cleaners 13 and 14, the axial outlets of which communicate by way of respective flexible hoses 15 and 16 with the inlet manifolds 11 and 12. The tractor also has a sheet metal hood 17 mounted on a longer pair and a shorter pair of links (not shown) so as to be displaceable for access purposes from its operative position, covering the engine, shown in FIG. 1. Longitudinally extending air supply ducting 18 of shallow rectangular cross-section is formed by disposing on the underside of the hood 17 a sheet metal trough with flanges 19 which has closed front and rear ends 20 and 21 with flanges 22. So as not to distort the hood 17, the flanges 19 and 22 are secured to its underside by adhesive. As shown in FIG. 2, the ducting 18 is cranked, that is to say deviates from a straight fore-and-aft configuration, to permit an upright exhaust pipe 23 to pass directly from the engine's exhaust manifold (not shown) through an aperture 24 in the hood 17, an upright exhaust silencer (not shown) being connected to the pipe 23 above the hood 17. At the front end of the ducting 18, the lower end of a short vertical tube 25 is secured by welding to the edges of an inlet hole 26 in the hood 17. A stack-cap 27 having a downwardly-facing annular air intake to prevent the ingress of rain is a push fit on the tube 25 and is thus situated above and towards the front of the hood 17, as far from the driver's position as convenience and styling will allow. The air cleaners 13 and 14 have respective vertically upwardly extending tangential inlet pipes 28 and 29 provided at their upper ends with radially outwardly extending flanges 30 and 31, to which soft rubber sealing ring 32 and 33 of substantially square radial cross-section are secured by adhesive. When the hood 17 is in its operative position, the inlet pipes 28 and 29 of the air cleaners 13 and 14 are substantially aligned with respective holes in annular plates 34 and 35 secured by spot-welding around respective exit holes 36 and 37 in the underside of the ducting 18, and the flanges 30 and 31 are so spaced from the plates 34 and 35 that the sealing rings 32 and 33 are compressed therebetween to prevent any leakage of the air being induced. The purpose of the plates 34 and 35 is to extend locally the area of the underside of the ducting 18 so as to permit without leakage a degree of misalignment between the inlet pipes 28 and 29 and the exit holes 36 and 37.

In another embodiment of the invention, the air supply ducting comprises a longitudinal integral bulge projecting upwardly from the hood and a flat metal sheet secured to the hood beneath said bulge to form the underside of the ducting, and the intake is built into the front end of said bulge. In other respects the arrangement is the same as said one embodiment.

In one modification, the stack-cap is replaced by a pre-cleaner. In another modification, applicable for example to a four-cylinder or three-cylinder engine, only a single inlet manifold, air cleaner, sealing ring and exit hole are provided. In a further modification, generally applicable, the or each annular plate is dispensed with and the or each sealing ring is secured to the underside of the ducting surrounding the, or the associated, exit hole therein. In yet another modification, generally applicable, the or each soft rubber sealing ring is replaced by a bellows, that is to say by a convoluted resilient sealing ring, secured at one end to the, or the associated, air cleaner inlet pipe flange or, dispensing with the or each annular plate, to the underside of the ducting surrounding the, or the associated, exit hole therein. In yet a further modification, generally applicable, the flange on the inlet pipe of the or each air cleaner is dispensed with and the, or the associated, soft rubber sealing ring is a push fit on the inlet pipe and has a frusto-conical periphery adapted to engage in the, or the associated, exit hole in the underside of the ducting, the or each annular plate being dispensed with. In a final modification, generally applicable, the ducting is secured by welding or by fasteners such as rivets or nuts and bolts to the hood instead of being secured thereto by adhesive.

We claim:

1. A tractor having an internal combustion engine containing at least two air cleaners with each air cleaner having an inlet and an outlet, the outlet of each air cleaner communicating with an inlet of a respective manifold of the engine, a hood displaceable from an operative position covering the engine and having an interior and exterior, and an elongated trough with closed ends which said trough is secured lengthwise to the interior of the hood as to form a longitudinally extending air supply ducting with said hood, said ducting having at its front end an intake opening which directly communicates with the exterior of the hood and also having at least two exit holes spaced apart from each other and rearwardly from the intake opening which each of said holes communicates, when the hood is in its operative position, with a respective inlet of one of the air cleaners by way of a resilient ring.

2. A tractor according to claim 1, wherein the trough is disposed on an underside of a top surface of the hood.

3. A tractor according to claim 1, wherein the trough is secured to the hood by adhesive.

4. A tractor according to claim 1, wherein the trough is cranked in plan view to avoid an exhaust pipe extending upright from the engine.

5. A tractor according to claim 1, wherein the sealing ring is secured to the inlet of each of the air cleaners.

6. A tractor according to claim 1, wherein the intake communicates with the exterior of the hood by way of a stack-cap.

7. A tractor according to claim 6, wherein the stack-cap is a push fit on a tube secured to the exterior of the hood and communicating with said intake opening of the air supply ducting.

8. A tractor according to claim 1, wherein the intake communicates with the exterior of the hood by way of a precleaner.

9. A tractor according to claim 8, wherein the precleaner is a push fit on a tube secured to the exterior of the hood and communicating with said intake opening of the air supply ducting.

* * * * *